United States Patent
Gallos et al.

(10) Patent No.: US 12,065,537 B2
(45) Date of Patent: Aug. 20, 2024

(54) SHAPE MEMORY POLYMER BASED ON POLY(HYDROXYALKANOATES)

(71) Applicant: Institut des Sciences et Industries du Vivant et de L'environnement—AgroparisTech, Paris (FR)

(72) Inventors: Antoine Gallos, Aumenancourt (FR); Florent Allais, Bouy (FR)

(73) Assignee: INSTITUT DES SCIENCES ET INDUSTRIES DU VIVANT ET DE L'ENVIRONNEMENT— AGROPARISTECH, Paris (FR)

( * ) Notice: Subject to any disclaimer, the term of this patent is extended or adjusted under 35 U.S.C. 154(b) by 564 days.

(21) Appl. No.: 17/429,913

(22) PCT Filed: Feb. 10, 2020

(86) PCT No.: PCT/EP2020/053280
§ 371 (c)(1),
(2) Date: Aug. 10, 2021

(87) PCT Pub. No.: WO2020/165075
PCT Pub. Date: Aug. 20, 2020

(65) Prior Publication Data
US 2022/0135734 A1    May 5, 2022

(30) Foreign Application Priority Data
Feb. 11, 2019    (FR) ........................... 1901322

(51) Int. Cl.
| | | |
|---|---|---|
| *C08G 63/08* | (2006.01) | |
| *C08J 3/12* | (2006.01) | |
| *C08K 3/26* | (2006.01) | |
| *C08K 5/10* | (2006.01) | |

(52) U.S. Cl.
CPC ............... *C08G 63/08* (2013.01); *C08J 3/12* (2013.01); *C08K 3/26* (2013.01); *C08K 5/10* (2013.01); *C08G 2230/00* (2013.01); *C08G 2280/00* (2013.01); *C08K 2003/265* (2013.01); *C08K 2201/005* (2013.01)

(58) Field of Classification Search
CPC ...... C08G 63/00; C08G 63/08; C08G 63/912; C08K 3/26; C08K 5/10
See application file for complete search history.

(56) References Cited

U.S. PATENT DOCUMENTS

| | | | |
|---|---|---|---|
| 8,252,887 B2 | 8/2012 | Bolikal et al. | |
| 2007/0254005 A1* | 11/2007 | Pathak ................... | A61P 31/00 424/423 |
| 2010/0240841 A1 | 9/2010 | Shimura et al. | |

FOREIGN PATENT DOCUMENTS

JP          5419517 B2    2/2014

OTHER PUBLICATIONS

Reano et al Ferulic Acid-Based Bis/Trisphenols as Renewable Antioxidants for Polypropylene and Poly(butylene succinate), ACS Sustainable Chem. Eng. 2016, 4, 6562-6571, published on Sep. 15, 2016.*
Reano et al Structure-Activity Relationships and Structural Design Optimization of a Series of-Hydroxycinnamic Acids-Based Bis- and Trisphenols as Novel Sustainable Antiradical/Antioxidant Additives, ACS Sustainable Chem. Eng.2015, 3, 3486-3496, published on Nov. 16, 2015.*
International Search Report for International Application No. PCT/EP2020/053280 dated Mar. 17, 2020, 2 pages.
International Written Opinion for International Application No. PCT/EP2020/053280 dated Mar. 17, 2020, 5 pages.
Reano et al., Structure-Activity Relationships and Structural Design Optimization of a Series of p-Hydroxycinnamic Acids-Based Bis- and Trisphenols as Novel Sustainable Antiradical/Antioxidant additives, ACS Sustainable Chemistry & Engineering, vol. 3, No. 12, (Dec. 7, 2015), pp. 3486-3496.

* cited by examiner

*Primary Examiner* — Gregory Listvoyb
(74) *Attorney, Agent, or Firm* — TraskBritt

(57) ABSTRACT

Shape memory polymers and copolymers are based on poly(hydroxyalkanoates) (PHA) and have improved elastomeric properties. The shape memory polymers and copolymers may be used as protective, reinforcement, cladding or embellishment material having mechanical properties enabling substitution to materials based on technical polymers such as plasticized PVC and polyolefins.

15 Claims, 5 Drawing Sheets

SHAPE MEMORY POLYMER BASED ON POLY(HYDROXYALKANOATES)

CROSS-REFERENCE TO RELATED APPLICATIONS

This application is a national phase entry under 35 U.S.C. § 371 of International Patent Application PCT/EP2020/053280, filed Feb. 10, 2020, designating the United States of America and published as International Patent Publication WO 2020/165075 A1 on Aug. 20, 2020, which claims the benefit under Article 8 of the Patent Cooperation Treaty to French Patent Application Serial No. FR1901322, filed Feb. 11, 2019.

TECHNICAL FIELD

This disclosure relates to the field of shape memory polymers. More particularly, the disclosure relates to polymers based on poly(hydroxyalkanoates) (PHA) and on copolymers having improved elastomeric properties. They are used as a protective, reinforcing, cladding or embellishment material having mechanical properties enabling substitution for materials based on technical polymers such as plasticized PVC, polyolefins, polyesters, polyurethanes and polyamides.

BACKGROUND

Shape memory polymers (SMP) are materials exhibiting a dynamic "memory" effect. Under the effect of stimulation, often thermal, these polymers have the ability to change from shape A to shape B.

Such polymers are particularly useful in the fields of textiles, medical devices, food packaging, etc.

At present, a large part of the shape memory polymers used are designed from poly(hydroxyalkanoates) (PHA), and more particularly polylactic acid (PLA), combined with thermoplastic polyurethanes (TPU).

PHAs are a family of polymers of the polyester type produced directly or indirectly by the fermentation of sugars and/or fatty substances by bacteria. Direct production is obtained by the transformation of sugars by bacteria into PHA. Indirect production is obtained by bacterial transformation of sugars into organic acids, which are then polymerized into PHA by enzymatic or chemical polymerization.

However, polymers based on PLA and TPU have many drawbacks. Indeed, due to the partial immiscibility of polyurethanes in polylactic acid, structural defects associated with a poor interface between the two phases appear; these are a recurring problem that limits their applications and that can accelerate the aging of these materials.

In addition, due to the immiscibility of polyurethanes in polylactic acid, the material formed is opaque, and not transparent, as is virgin PLA.

It can also be noted that the combustion of polyurethanes is known to release harmful fumes, loaded with hydrogen cyanide, which limits their use in areas where there is a risk of combustion (building sector, transport, etc.).

Finally, one of the main defects of the PLA/TPU mixture is the glass transition temperature (temperature from which the shape memory effect occurs) of the order of 50 to 60° C., which limits its applications in the medical field, where the shape memory effect must be at temperatures close to that of the human body.

Document US 2010/240841 describes shape memory polymers based on polylactic acid and chemical additives. The elasticity, the shape memory and the reversibility of the deformations are obtained by chemical modification of the polylactic acid in particular by making it crosslink with crosslinking agents to obtain a three-dimensional network made of covalent bonds. It is known that covalently cross-linked three-dimensional networks are very strong. However, they have several defects due to their strength: they are more difficult to recycle, their shaping is more complicated or even impossible after crosslinking (e.g., spinning, 3D printing) and they are not or are only slightly biodegradable. Furthermore, crosslinking agents are often toxic; for example, isocyanates are crosslinking agents well known for their toxicity.

There is a need to have shape memory polymers with improved properties.

BRIEF SUMMARY

A novel shape memory polymer composition has been developed that is composed of polylactic acid (PLA) and p-hydroxycinnamic acid derivatives (PAD), which has many advantages over existing polymers.

Thus, the present disclosure relates to a material with elastomeric property and shape memory composed (i) of a polymer of formula (A1) consisting of at least one poly(hydroxyalkanoate) (PHA) optionally mixed with at least one copolymer and (ii) at least 25% by mass of at least one functional additive of formula (B1) or (B2).

It also relates to a method of manufacturing such an elastomeric material with shape memory.

It also relates to the use of this material to prevent/slow down the aging of the composites containing it, to confer anti-UV properties on a composite material containing it and more generally to the use of this material as a protective, reinforcing, cladding or embellishment material having mechanical properties allowing a substitution for materials based on technical polymers such as plasticized PVC and polyolefins.

Advantages of the Disclosure

As stated above, the shape memory polymers according to the disclosure exhibit particularly advantageous characteristics.

Indeed, the innovative material designed and disclosed herein has the advantage of being able to be biobased, that is to say that the material with shape-memory elastomeric properties created and disclosed herein is made from renewable raw materials derived from biomass. This makes it possible in particular to reduce the environmental and health impact of such a material.

This material also has the advantage of not being an endocrine disruptor; in fact, no endocrine disrupting activity has been detected on various human receptors, such as estrogen receptors for example. It also shows no genotoxic activity and is not carcinogenic. This makes it possible in particular to envisage a medical use of the material, in particular in implantable medical devices, or even uses in childcare, in contact with food or in the textile field.

Unlike the PLA/TPU mixture, the material according to the disclosure is transparent and completely amorphous. This characteristic is particularly useful in the field of packaging, where a transparent container is often sought to highlight the product contained in the packaging.

It is also noted that, unlike the PLA/TPU mixture, the material according to the disclosure does not produce toxic fumes other than the carbon dioxide and monoxide that are found in any combustion. This allows the innovative material to be used in fields where a risk of combustion of the material exists, such as the transport or construction fields.

The innovative material developed and disclosed herein also has the advantage of being stable over time. Indeed, it has been demonstrated that the product disclosed herein does not undergo any phase separation or even loss of transparency over time. No migration or exudation of the PAD was also noted during the various studies.

This material also has the advantage of having a glass transition temperature that is easily adaptable as a function of the amount of PAD and of the chemical formula of the latter, due to the miscibility of its constituents. For example, a PAD composed of hydrogenated ferulic acid and 1,4-butanediol (designated "BDF") incorporated at 30% by mass in PLA makes it possible to obtain a material whose glass transition ($T_g$) is around 24° C., while a PAD composed of unsaturated ferulic acid and butanediol (designated "BDFI") incorporated at 30% by mass in PLA makes it possible to obtain a material whose glass transition is around 35° C. In another example, a PAD (here BDF) incorporated at 25% by mass in PLA makes it possible to obtain a material whose glass transition is close to 28° C. Thus, this makes this compound usable in a large number of fields and situations, by adapting the glass transition temperature as a function of the temperature at which the shape memory effect must take place.

It has also been observed that the material according to the disclosure exhibits anti-UV properties. These properties make it possible to imagine a use of the material to confer sun protection, in particular in the agricultural field or in food packaging.

The material according to the disclosure also exhibits antioxidant properties. Owing to such properties, the polymer is protected from thermo-oxidative degradation both during the production process (short-term stabilization) and in the following phases of processing and use. These properties could be enhanced in the context of complementary composite mixtures by protecting loads that are potentially sensitive to oxidative degradation.

The material according to the disclosure also exhibits improved mechanical properties compared to virgin PLA and to PLA/TPU blends, in particular in terms of impact resistance, flexibility and elongation. These properties would allow applications as a substitute for plasticized PVC (which generally contains phthalates known to be endocrine disruptors), in particular in the building sector (floor coverings or joinery, for example), or as a substitute for polyolefins in the transport sector (interior elements such as decks or door reinforcements, for example).

In addition, the material according to the disclosure is obtained in the absence of a quantifiable chemical reaction between the PADs and the PHAs, which implies that the network is not covalently crosslinked (unlike the material described in US 2010/240841). This has several advantages: the PHA/PAD mixture is completely soluble in certain solvents, such as chloroform or THF. The PHA/PAD mixture is completely re-processable and can be recycled and/or reshaped via plastics processing (e.g., molten injection, spinning, pressing, 3D printing). It is biodegradable and can be compounded for example with chalk (see the experimental section presenting these two properties).

The present disclosure also has the advantage of being very simple to implement. Indeed, the PADs being in powder form, their use does not require any modification of the equipment used in plastics processing, in particular for a use in mixture with the PLA. The material can thus be melt injected or shaped by 3D printing.

Thus, by virtue of all the qualities mentioned above, the material according to the disclosure has a much wider field of application than the materials of the prior art.

DETAILED DESCRIPTION

Figure 1:
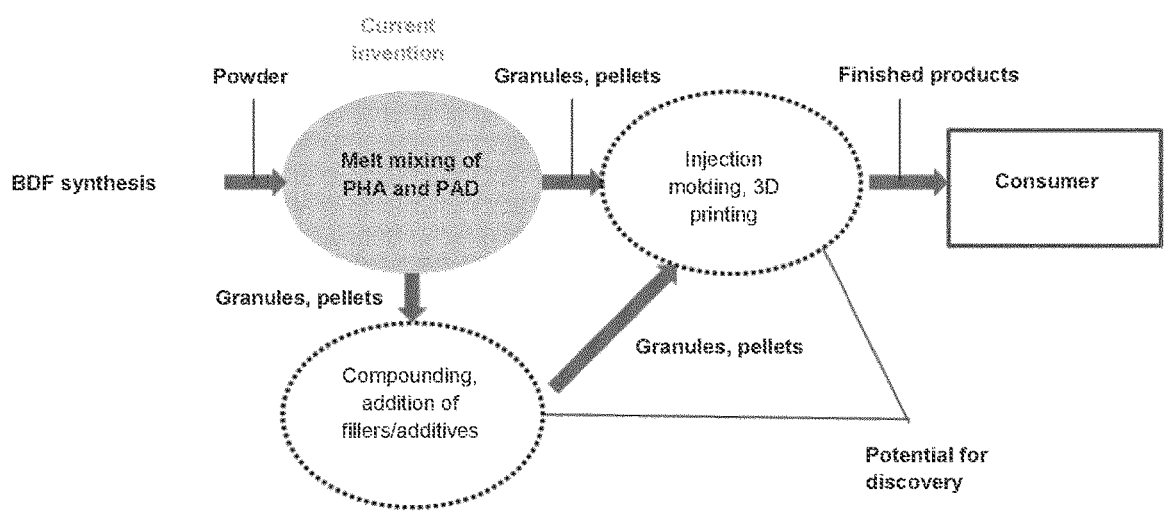
FIG. 1 is a simplified diagram of the introduction of the product into the value chain and existing industrial methods.

A first subject of the disclosure relates to a material with elastomeric properties and shape memory composed (i) of a polymer of formula (A1) consisting of at least one poly(hydroxyalkanoate) (PHA) optionally mixed with at least one copolymer and (ii) at least 25% by mass of at least one functional additive of formula (B1) or (B2).

It has been shown that it is not necessary for the polymer chains to consist entirely of monomer units specific to PHAs for this shape memory effect to occur. On the contrary, copolymers comprising mixtures of PHA monomers and copolymers comprising mixtures of PHA monomers as well as monomers of other polymers (e.g., polycaprolactone) also exhibit shape memory properties linked to the formation of these clusters of molecules (functional additives) of formula (B1) or (B2), in particular PAD, when these additives are incorporated at a mass rate greater than or equal to 25%.

The term "elastomeric material" according to the disclosure is understood to mean a polymer exhibiting elastic properties. The material according to the disclosure thus exhibits great flexibility, good resistance to tearing and an ability to spontaneously regain its initial shape.

"Shape memory material" refers to a material capable of changing shape under the effect of stimulation, for example heat. A shape memory material is characterized in that its deformation is reversible, in the case of the materials according to the disclosure, as a function of heat.

More precisely and in accordance with the disclosure, in the case of a uniaxial or multiaxial deformation (e.g., elongation, bending, shock), the recovery kinetics of the initial shape without stress on each of the deformation axes is zero at a temperature 20° C. lower than the glass transition ($T_g$). These recovery kinetics of the initial shape become greater than or equal to 30% per hour at a temperature 10° C. lower than the $T_g$. These recovery kinetics of the initial shape become greater than or equal to 80% per hour at a temperature greater than or equal to $T_g$.

By way of illustration, the material according to the disclosure can be kept in a constrained shape (for example folded back on itself) when it is subjected to low temperatures (preferably between −80 and 20° C., most preferably at 4° C.). This is particularly illustrated in Example 2.

"Functional additive" refers to an additive that has chemical functions conferring specific properties on it giving the PHAs a shape memory.

The polymer of formula (A1) consisting of at least one poly(hydroxyalkanoate) (PHA) optionally mixed with at least one copolymer, present in the material according to the disclosure, corresponds to the following general formula:

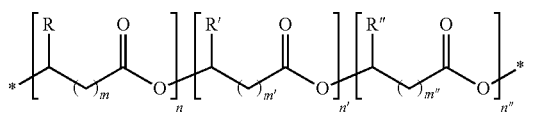

(A1)

wherein
- n, n' and n" are the same or different, and represent the number of monomer units, with n, n' and n" greater than or equal to 0, with the sum of n and n' and n" greater than 2;
- m, m' and m" are the same or different, and represent the number of —CH$_2$— groups present in the carbon chain of the repeat monomer unit, with m, m' and m" greater than or equal to 0;
- R, R', and R" are the same or different, and represent a hydrogen atom or an alkyl group of formula $C_xH_{2x+1}$ with x, which is an integer greater than or equal to 0.

In a preferred embodiment, n, n' and n" are between 0 to 10,000, and/or m, m' and m" are between 0 and 20, and/or x is between 0 and 20.

In an even more preferred embodiment, n, n' and n" are between 0 and 3000 and/or m, m' and m" are between 0 and 6 and/or x is between 0 and 6.

In a particular embodiment, the shape memory material is obtained from a polymer of formula (A2) consisting entirely of monomer units specific to PHAs:

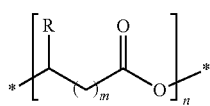

(A2)

wherein
- n represents the number of monomer units, with n>2;
- m represents the number of —CH$_2$— groups present in the carbon chain of the repeat monomer unit, with m greater than or equal to 0;
- R represents a hydrogen atom or an alkyl group of formula $C_xH_{2x1}$ with x, which is an integer greater than or equal to 0.

In a preferred embodiment, n is between 2 and 10,000, and/or m is between 0 and 20, and/or x is between 0 and 20.

In an even more preferred embodiment, n is between 2 and 3000 and/or m is between 0 and 6 and/or x is between 0 and 6.

In another alternative embodiment, the material according to the disclosure consists of several PHAs of formula (A2) and of at least 25% by mass of at least one p-hydroxycinnamic acid derivative (PAD) of formula (B3), (B4) or (B5).

In a preferred embodiment, the disclosure relates to a material with elastomeric property and shape memory composed of polylactic acid (PLA) and at least 25% by mass of at least one derivative of p-hydroxycinnamic acid (PAD) of formula (B3), (B4) or (B5).

In a more preferred embodiment, the disclosure relates to a material with elastomeric properties and shape memory composed of polylactic acid (PLA) and at least 25% by mass of at least one derivative of p-hydroxycinnamic acid (PAD) of formula (B6), (B7) or (B8).

The "polylactic acid" is a PHA of general formula (A2) in which m=0 and R is a —CH$_3$ group that is fully biodegradable. It is obtained by polymerization of lactic acid (D, L or D/L mixture), or by polymerization of lactide (DD, LL or meso), resulting from the fermentation of sugars, having formula (A3) below:

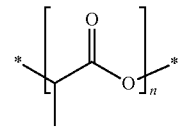

(A3)

in which n represents the number of monomer units, with n greater than 2.

Preferably, n is between 2 and 3000.

In another particular embodiment, the material according to the disclosure consists of several PHAs and copolymers of formula (A1) and of at least 25% by mass of at least one derivative of p-hydroxycinnamic acid (PAD) of formula (B3), (B4), (B5), (B6), (B7) or (B8).

In another particular embodiment of the disclosure, the compound of formula (A1) is a copolymer based on PLA and PGA represented by the following formula (A4):

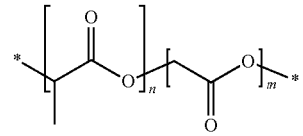

(A4)

in which n and m represent the number of monomer units, n and m being respectively greater than 1.

Furthermore, it has been demonstrated by the synthesis and the testing of several analogues of a particular derivative of PAD, namely BDF, that the molecules that have a succession of hydrophobic and hydrophilic groups compatible with the PHA used for the mixture and with at least two or three aromatic rings linked by an aliphatic chain made up of at least three chemical functions (e.g., alkyls, esters, ethers, amides) make it possible to obtain shape memory properties when they are incorporated at a mass rate greater than or equal to 25%. Thus, new shape memory materials have been prepared by combining a polymer of formula (A1) consisting of at least one poly(hydroxyalkanoate) (PHA) optionally mixed with at least one copolymer and a functional additive of general formula (B1) or (B2).

The term "hydrophobic and hydrophilic groups "compatible" with the PHA" is understood to mean groups that are completely miscible with the PHA at a rate less than or equal to 20% by mass.

Thus, it is understood that in the context of the present disclosure, any molecule corresponding to one of formulas B1 or B2 and that exhibits total miscibility in a PHA up to a mass content of 20% will yield a shape memory effect when the mass rate of incorporation increases to 25% or more.

The compounds of formula (B1) and (B2) are functional additives making it possible to form a network in the PHA and the copolymers optionally mixed, to form a shape memory material according to the disclosure. The network, comparable to a crosslinking network, is formed of non-covalent, and therefore reversible, bonds.

The compounds of formula (B1) correspond to the following formula:

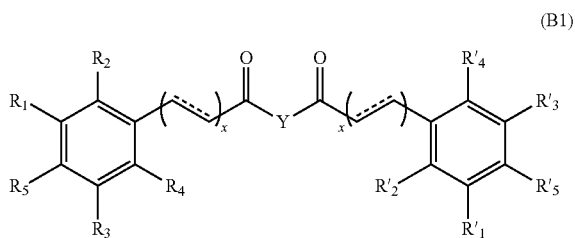

(B1)

wherein:
$R_1$, $R'_1$, $R_2$, $R'_2$, $R_3$, $R'_3$, $R_4$, $R'_4$, $R_5$ and $R'_5$, the same or different, each represent a hydrogen atom, a chlorine atom, a bromine atom, an iodine atom, a fluorine atom, an amine ($NH_2$), an alcohol (OH), a thiol (SH), a phosphane ($PH_2$), an alkyl, benzyl, X-alkyl, optionally substituted, X-benzyl group, where appropriate substituted, X-benzoyl, optionally substituted, X-acyl, $B(OR')_2$, NHR', $NO_2$, SR'O or $SO_2R'$,
where X represents N, O, S or P
and R' represents an alkyl group or an aryl group,
Y represents a linear or cyclic or branched alkyl group, alkenyl, alkynyl, a linear or cyclic diol, an —O—$(CH_2)_n$—O— type diol with $1<n<30$ (e.g., 1,3-propanediol, 1,4-butanediol), a polyethylene glycol (PEG), a linear or cyclic diamine, a diamine of type —NR"—$(CH_2)_n$—NR"— with $1<n<30$ (e.g., 1,3-propanediamine, 1,4-butanediamine)
where R" represents a hydrogen, a linear, cyclic or branched alkyl group, an aryl group, a protecting group of the acyl, benzyl or benzoyl type
x is an integer between 0 and 6.

An example of a molecule corresponding to formula (B1) is a derivative of benzoic acid, where two benzoic acids are linked together by butane-1,4-diol.

The compounds of formula (B2) correspond to the following formula:

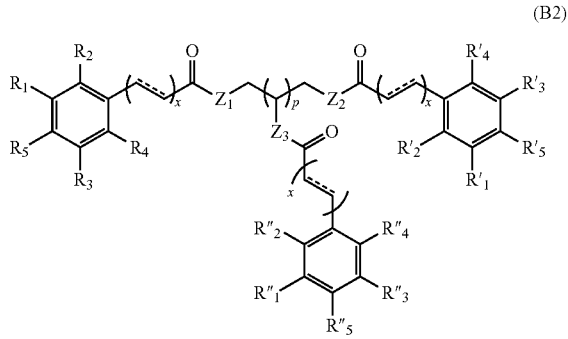

(B2)

wherein:
$R_1$, $R'_1$, $R''_1$, $R_2$, $R'_2$, $R''_2$, $R_3$, $R'_3$, $R''_3$, $R_4$, $R'_4$, $R''_4$, $R_5$, $R'_5$ and $R''_5$, the same or different, each represent a hydrogen atom, a chlorine atom, a bromine atom, an iodine atom, a fluorine atom, an amine ($NH_2$), an alcohol (OH), a thiol (SH), a phosphane ($PH_2$), an alkyl, benzyl, X-alkyl, optionally substituted, X-benzyl, optionally substituted, X-benzoyl, optionally substituted, X-acyl group, $B(OR')_2$, NHR', $NO_2$, SR'O or $SO_2R'$,
where X represents N, O, S or P
and R' represents an alkyl group or an aryl group,
$Z_1$, $Z_2$ and $Z_3$, different or the same, represent an oxygen or nitrogen atom (substituted by a hydrogen, an alkyl group, an aryl group, a protecting group of the acyl, benzyl, benzoyl type)
p is an integer between 1 and 30
x is an integer between 0 and 6

The molecules corresponding to general formulas (B1) and (B2) can be used alone or in combination. In the case of a combination, the percentage by mass of incorporation corresponds to all of these molecules.

Among these compounds of formulas (B1) and (B2), preferred compounds are p-hydroxycinnamic acid derivatives (abbreviated "PAD"); they are additives synthesized from p-hydroxycinnamic acid (e.g., coumaric acid, ferulic acid, sinapic acid, caffeic acid) and diol or triol (e.g., 1,3-propanediol, 1,4-butanediol, 1,5-pentanediol, 1,6-hexanediol, cyclohexanediol, isosorbide, glycerol).

Preferred compounds according to the disclosure are PADs. More particularly, preferred compounds of formula (B1) are grouped together under formula (B3), while preferred compounds of formula (B2) are grouped under formulas (B4) and (B5).

In the context of the present disclosure, the preferred PADs are therefore of general formula (B3), (B4) or (B5), that is to say, a PAD of formula (B3) below:

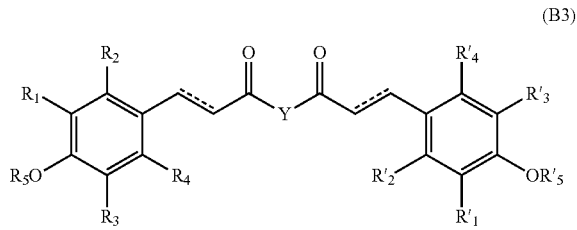

(B3)

wherein:

R$_1$, R'$_1$, R$_2$, R'$_2$, R$_3$, R'$_3$, R$_4$ and R'$_4$ are the same or different, and each of them represents a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R', where X represents N, O, S or P and R' represents an alkyl group or an aryl group, R$_5$ and R'$_5$ are the same or different, and each of them represents a hydrogen atom, an acyl, alkyl (linear or cyclic), aryl, benzyl, benzoyl group Y represents a linear or cyclic or branched alkyl group, alkenyl, alkynyl, a linear or cyclic diol, an —O—(CH$_2$)$_n$—O— type diol with 1<n<30 (e.g., 1,3-propanediol, 1,4-butanediol), a polyethylene glycol (PEG), a linear or cyclic diamine, a diamine of type —NR"—(CH$_2$)$_n$—NR"— with 1<n<30 (e.g., 1,3-propanediamine, 1,4-butanediamine)

where R" represents a linear, cyclic or branched alkyl group, an aryl group, a protecting group of the acyl, benzyl or benzoyl type or of formula (B4) below:

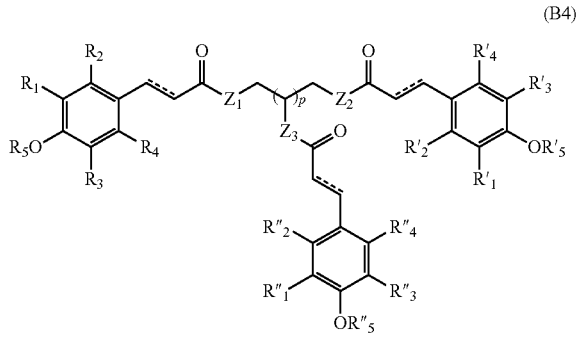

(B4)

wherein:

R$_1$, R'$_1$, R"$_1$, R$_2$, R'$_2$, R"$_2$, R$_3$, R'$_3$, R"$_3$, R$_4$, R'$_4$ and R"$_4$, are the same or different and each of them represents a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R', where X represents N, O, S or P and R' represents an alkyl group or an aryl group, R$_5$, R'$_5$ and R"$_5$ are the same or different and each represent a hydrogen atom, an acyl, alkyl (linear or cyclic or branched), aryl, benzyl, benzoyl group Z$_1$, Z$_2$ and Z$_3$ are different or the same, and represent an oxygen or nitrogen atom (substituted by a hydrogen, an alkyl group, an aryl group, a protecting group of the acyl, benzyl or benzoyl type)

p is an integer between 1 and 30 or of formula (B5) below:

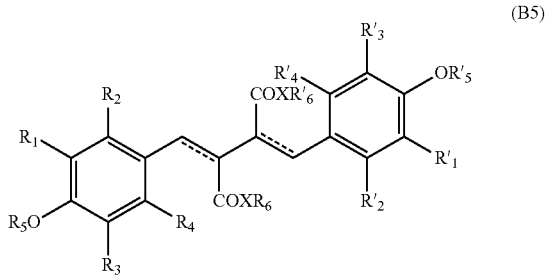

(B5)

wherein:

R$_1$, R'$_1$, R$_2$, R'$_2$, R$_3$, R'$_3$, R$_4$ and R'$_4$ are the same or different, and each represent a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R', where X represents N, O, S or P and R' represents an alkyl group or an aryl group, R$_5$ and R'$_5$, are the same or different and represent hydrogen, a linear, cyclic or branched alkyl group, a protecting group of the acetyl, benzyl or benzoyl type;

R$_6$ and R'$_6$ are the same or different and represent a linear, cyclic or branched alkyl group or a hydro(mono- or di-)organic acid group, any other chemical unit such as for example a carbohydrate, or an amino acid;

X is an O, a NR$_7$ group in which R$_7$ is hydrogen, a linear, cyclic or branched alkyl group, aryl, an acyl, benzyl, or benzoyl type protecting group.

Even more preferred compounds according to the disclosure are PADs. More particularly, preferred compounds of formula (B3) are grouped together under formula (B6), while preferred compounds of formula (B4) are grouped under formulas (B7) and (B8).

In the context of the present disclosure, the more preferred PADs are therefore of general formula (B6), (B7) or (B8):

PADs of formula (B6) are represented by the formula below:

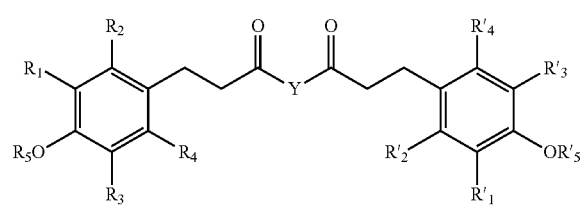

(B6)

wherein:

R$_1$, R'$_1$, R$_2$, R'$_2$, R$_3$, R'$_3$, R$_4$ and R'$_4$ are the same or different, and each represent a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R', where X represents N, O, S or P and R' represents an alkyl group or an aryl group, R$_5$ and R'$_5$ are the same or different, and each of them represents a hydrogen atom, an acyl, alkyl (linear or cyclic), aryl, benzyl, benzoyl group Y represents a linear or cyclic or branched alkyl group, alkenyl, alkynyl, a linear or cyclic diol, an —O—(CH$_2$)$_n$—O— type diol with 1<n<30 (e.g., 1,3-propanediol, 1,4-butanediol), a polyethylene glycol (PEG), a linear or cyclic diamine, a diamine of type —NR"—(CH$_2$)$_n$—NR"— with 1<n<30 (e.g., 1,3-propanediamine, 1,4-butanediamine)

where R" represents a linear, cyclic or branched alkyl group, an aryl group, a protecting group of the acyl, benzyl or benzoyl type.

The PADs of formula (B7) are represented by the formula below:

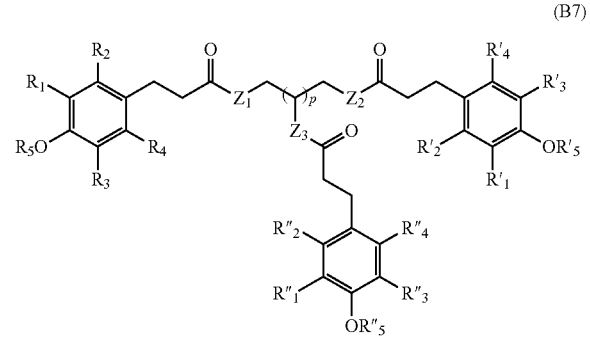

(B7)

wherein:

R$_1$, R'$_1$, R"$_1$, R$_2$, R'$_2$, R"$_2$, R$_3$, R'$_3$, R"$_3$, R$_4$, R'$_4$ and R"$_4$ are the same or different and each represent a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R', where X represents N, O, S or P and R' represents an alkyl group or an aryl group, R$_5$, R'$_5$ and R"$_5$ are the same or different and each represent a hydrogen atom, an acyl, alkyl (linear or cyclic or branched), aryl, benzyl, benzoyl group Z$_1$, Z$_2$ and Z$_3$ are different or the same and represent an oxygen or nitrogen atom (substituted by a hydrogen, an alkyl group, an aryl group, a protecting group of the acyl, benzyl or benzoyl type)

p is an integer between 1 and 30

The PADs of formula (B8) are represented by the formula below:

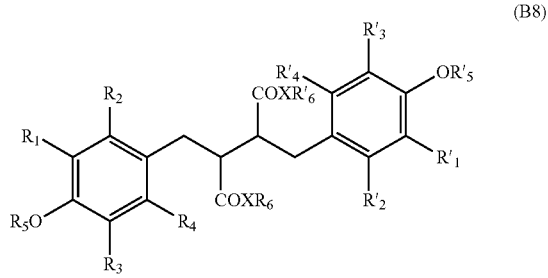

(B8)

wherein:

R$_1$, R'$_1$, R$_2$, R'$_2$, R$_3$, R'$_3$, R$_4$ and R'$_4$ are the same or different, and each represent a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R', where X represents N, O, S or P and R' represents an alkyl group or an aryl group, R$_5$ and R'$_5$ are the same or different and represent hydrogen, a linear, cyclic or branched alkyl group, a protecting group of the acetyl, benzyl or benzoyl type;

R$_6$ and R'$_6$ are the same or different and represent a linear, cyclic or branched alkyl group or a hydro(mono- or di-)organic acid group, any other chemical unit such as for example a carbohydrate, or an amino acid;

X is an O, a NR$_7$ group in which R$_7$ is hydrogen, a linear, cyclic or branched alkyl group, aryl, an acyl, benzyl, or benzoyl type protecting group.

In an even more preferred embodiment of the disclosure, the PAD is a ferulic acid derivative (abbreviated "FAD").

In an even more preferred embodiment, the PAD is butane-1,4-di(dihydroferulate) (BDF) of formula (B9):

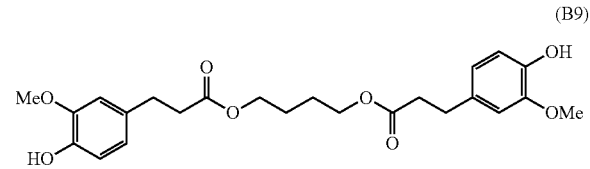 [SMILES: COc1cc(CCC(=O)OCCCCOC(=O)CCc2ccc(O)c(OC)c2)ccc1O]

(B9)

Thus, in a preferred embodiment, the material according to the disclosure consists of a mixture of PLA and FAD.

In an even more preferred embodiment, the material consists of a mixture of PLA and BDF.

Thus, in a most preferred embodiment, the disclosure relates to a material with elastomeric properties and shape memory composed of polylactic acid (of formula A3) and at least 25% by mass of BDF (of formula B9).

The material according to the disclosure can comprise a PAD or a mixture of several PADs.

Some PADs are compounds known to have plasticizing power in the PHA. They are generally used at rates of between 5 and 20% by mass in PHA, because it is accepted in the prior art relating to usual plasticizers (such as ester citrates, glycerol or polyethylene glycols, for example) that there is a phase separation phenomenon when the mass rate of the plasticizer exceeds a critical threshold, which is generally 20% by mass of plasticizer in PLA. This phase separation phenomenon generally very strongly degrades the mechanical properties of materials based on plasticized PLA and produces exudations of plasticizer on the surface of the material.

Completely surprisingly, it has been demonstrated that PAD levels higher than the critical threshold of 20% not only do not lead to phase separation, but above all that they allow the appearance of properties related to elastomers as well as shape memory properties not possessed by PLA formulations containing 5, 10 or 20% PAD (Example 1).

Indeed, a series of tests carried out on mixtures of a PAD (the BDF) and a PHA (the PLA), with a mass quantity of BDF between 0% and 40%, showed a dramatic change and unexpected elongation at break of the material as soon as the BDF mass percentage reaches 25%. This elongation at break goes from a value less than 10% for quantities of BDF less than or equal to 20% by mass to a value greater than 330% for quantities of BDF greater than or equal to 25% by mass (FIG. 6a). The effect is optimal from 30% by mass of BDF.

The disclosure thus relates to a material with elastomeric properties and shape memory comprising PHA and at least 25% by mass of PAD.

In one advantageous embodiment, the disclosure relates to a material composed of PLA and from 25 to 50% by mass of PAD, in particular from 30 to 40% by mass of PAD.

In a most advantageous embodiment, the disclosure relates to a material composed of PLA and 30% PAD.

In a preferred embodiment of the disclosure, the material with elastomeric properties and shape memory consists of a mixture of PLA and FAD according to the proportions defined above.

In an even more preferred embodiment, the material consists of a mixture of PLA and BDF according to the proportions defined above.

In one advantageous embodiment, the PADs are in the form of a viscous fluid, which allows use under conditions similar to other usual plasticizing additives such as glycerol, for example. It can in particular be carried out by the molten route, a method that is well known by those skilled in the art.

In a most advantageous embodiment, the functional additives of formulas (B1) and (B2) such as PADs, in particular FAD and DBF, are in powder form, which greatly facilitates the processing of the material. The material can in particular be prepared by the molten route, a method that is well known by those skilled in the art.

In one particular embodiment, the material is formulated in the form of granules or pellets in a production unit, with a view to being shaped subsequently.

In a more particular embodiment, a complementary compounding is carried out from the binary PHA-PAD mixture (in the proportions described above) into which new fillers (organic or inorganic) are incorporated in order to develop other properties and new applications of the material according to the disclosure compared to other polymers based on PHA. An example of a value chain for this material is shown in FIG. 1.

The term "compounding" is understood to mean mixing, by melting, fillers/additives with plastics in order to make them acquire new properties.

It is understood that when a material composed of PHA and at least 25% by mass of PAD is described, the disclosure is constituted by the ratio existing between PHA and PAD, namely between 75/25 and 50/50, in particular at a 70/30 ratio. Thus, when additives are added to the mixture, this ratio between PHA and PAD is respected and the properties associated with the PHA+PAD material are found in the final composite material.

Thus, in one particular embodiment of the disclosure, the material according to the disclosure additionally comprises adjuvants. These adjuvants make it possible in particular to improve the properties of the compound or to give it new properties. The adjuvants can for example be dyes to confer a translucent or opaque coloring on the material, organic or mineral fillers serving to reinforce the material, flame retardants aimed at improving the fire resistance of the material, antimicrobial additives to develop antimicrobial properties or fibers (synthetic, mineral, vegetable) acting as a filler for the preparation of composite materials.

The material according to the disclosure consists of PLA and PAD, two compounds most often derived from renewable raw materials derived from biomass; it is therefore generally biobased.

"Biobased material" refers to a material in which 50% of the atoms are derived from renewable resources, for example from biomass.

In a preferred embodiment of the disclosure, the material according to the disclosure is at least 50% biobased. In a more preferred embodiment of the disclosure, the material according to the disclosure is 80%, or even 100% biobased.

The fact that the material is biobased makes it possible to reduce its environmental impact. At a time when pollution and limited resources are an essential issue, the material according to the disclosure presents an ecological and renewable alternative to the shape memory materials currently on the market.

A second object of the disclosure relates to a method for manufacturing an elastomeric material with shape memory as defined above, composed (i) of a polymer of formula (A1) consisting of at least one poly(hydroxyalkanoate) (PHA) optionally as a mixture with at least one copolymer and (ii) at least 25% by mass of at least one functional additive of formula (B1) or (B2).

This method can be implemented according to the conventional mixing method by the molten route.

In one particular embodiment, the disclosure relates to a method of manufacturing an elastomeric material with shape memory composed of a poly(hydroxyalkanoate) (PHA) of formula (A2) and at least 25% by mass of at least one p-hydroxycinnamic acid derivative (PAD) of formula (B3), (B4) or (B5) as described above.

In one preferred embodiment, this method can also be implemented by adding PHA and PAD in an internal mixer or extruder (twin or single screw) between 140° C. and 200° C. with a speed of rotation of screw(s) of 10 to 150 revolutions per minute and a residence time of 1 minute to 30 minutes.

Even more preferably, this method can be implemented by adding PLA and PAD in an internal mixer or extruder (twin or single screw) between 160° C. and 190° C. with a speed of rotation of the screw(s) of 50 to 100 revolutions per minute and a residence time of 5 minutes to 20 minutes.

In one preferred embodiment, the manufacturing method may further comprise a step of adding additives to the mixture, in order to improve the properties of the material or to make it acquire new ones. The additives can for example be dyes to confer a translucent or opaque coloring on the material, organic or mineral fillers serving to reinforce the material, flame retardants aimed at improving the fire resistance of the material, antimicrobial additives to develop antimicrobial properties or fibers (synthetic, mineral, vegetable) acting as a filler for the preparation of composite materials.

A third object of the disclosure relates to the use of a material based on PHA and at least 25% by mass of PAD as described above in order to prevent/slow down the aging of the composites obtained from the material according to disclosure and additives or reinforcing fillers added to the material.

This use is based on the antioxidant properties of the material according to the disclosure.

A third object of the disclosure relates to the use of a material as described above in order to prevent/slow down the aging of the composites obtained from the material and adjuvants such as reinforcing fillers added to the material.

In one particular embodiment, the material used to prevent/slow down the aging of the composites is a material based on PHA and at least 25% by mass of PAD.

A fourth object of the disclosure relates to the use of a material as described above to confer anti-UV properties on a composite material containing it.

In one particular embodiment, the material used to confer anti-UV properties on the composite material is a material based on PHA and at least 25% by mass of PAD.

This use follows directly from the anti-UV properties of the material according to the disclosure. Indeed, due to the UV absorbance of certain PADs, such as butane-1,4-di(dihydroferulate) (BDF), which absorbs UV between 200 and 300 nm, and the high concentration of PAD in the final material, the material can serve as partial sun protection by absorbing a significant amount of UV-A and UV-B. A concrete application of this property concerns the field of packaging. Incorporating a material according to the disclosure into a composite intended for packaging makes it possible to improve the conservation of the content by protecting it from part of the UV rays while maintaining the transparency of the container. An application in the food industry would in particular be very advantageous.

A fourth object of the disclosure relates to the use of a material as described above as a protective, reinforcing, cladding or embellishment material having mechanical properties enabling substitution for materials based on technical polymers such as plasticized PVC, polyolefins, polyesters, polyurethanes and polyamides.

Indeed, the materials according to the disclosure can be proposed to protect, reinforce, clad and/embellish any type of surface covered by or made up of plastics, for example as a replacement (substitute material) for plasticized PVC and polyolefins.

In one particular embodiment, the protective, reinforcing, cladding or embellishment material is a material based on PHA and at least 25% by mass of PAD.

The PVC materials that can be substituted by the materials according to the disclosure are, for example, flexible and transparent films such as rain protection, flexible films and solid pieces serving as floor covering, flexible manufactured objects that can serve as water-resistant toys or resistant solid pieces that can be used as joinery for windows, patio doors or even roof overhangs.

The desired properties for these types of materials are transparency, water resistance, resistance to impacts, flexibility, suppleness and the possibility of integrating dyes, reinforcing fillers or even flame retardant additives as described above in order to meet the specifications of the intended application. Thus, by virtue of its properties, the material according to the disclosure proves to be particularly suitable for replacing PVC in these applications.

The polyolefin materials that can be substituted by the materials according to the disclosure are, for example, solid parts serving as reinforcements for the door, the dashboard or even the rear window platform of a vehicle. These can also be the materials used for the shells of household appliances such as screens, keyboards, laptops or even mobile phones.

The desired properties are impact resistance and the possibility of integrating dyes, reinforcing fillers or even flame retardant additives as described above in order to meet the specifications of the intended application.

Thus, by virtue of its properties, the material according to the disclosure proves to be particularly suitable for replacing polyolefins in these applications.

A fifth object of the disclosure relates to the use of the material as described above in the medical field.

The material according to the disclosure can be used both in paramedical equipment and in the biomedical field. It can in particular be used as a biomaterial in prostheses, orthoses, implants, dressings, sutures, personal protective equipment (gloves, gowns, caps, glasses), infusion bags and catheters.

EXPERIMENTAL SECTION

Examples 1 and 2 detailed below were carried out with a particular PHA, which is polylactic acid (PLA), and two particular PADs, which are butane-1,4-di(dihydroferulate) (BDF) and butane-1,4-diylbis(3-(3,4-dimethoxyphenyl)propanoate) (BDF-Me).

Detailed examples 3 to 8 below were carried out with a particular PHA, which is polylactic acid (PLA), a particular PHA, which is a copolymer of polylactic acid (PLA) at 86 mol % and polyglycolic acid (PGA) at 14 mol %, a particular PAD, which is butane-1,4-di(dihydroferulate) (BDF), and raw chalk composed of 98% calcium carbonate ($CaCO_3$) having a particle size of less than or equal to 20 m.

The PLA formula is the following formula (A3):

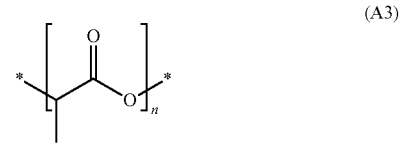

(A3)

in which n represents the number of monomer units, n being greater than 2.

The formula of the copolymer based on PLA and PGA is the following formula (A4):

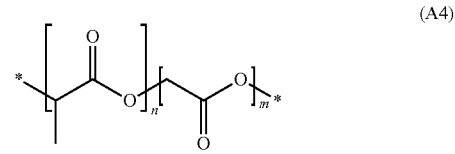

(A4)

in which n and m represent the number of monomer units, n and m being respectively greater than 1.

The BDF formula is as follows:

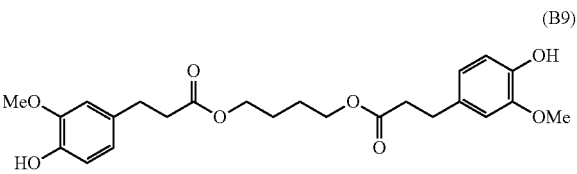 [SMILES: COc1cc(CCC(=O)OCCCCOC(=O)CCc2ccc(O)c(OC)c2)ccc1O]

(B9)

The BDF-Me formula is as follows:

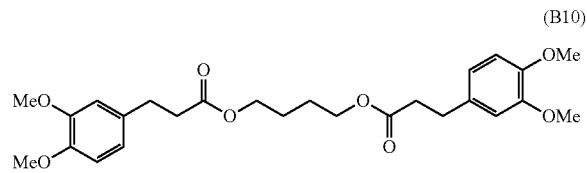 [SMILES: COc1ccc(CCC(=O)OCCCCOC(=O)CCc2ccc(OC)c(OC)c2)cc1OC]

(B10)

Example 1: Effect of Different Levels of BDF in PLA

The performed test consists of a tensile test at 20° C. carried out on PLA test pieces measuring 74.0 mm×4.1 mm×2.0 mm (ISO 527-2-5 A) comprising different levels of BDF.

Figure 2:
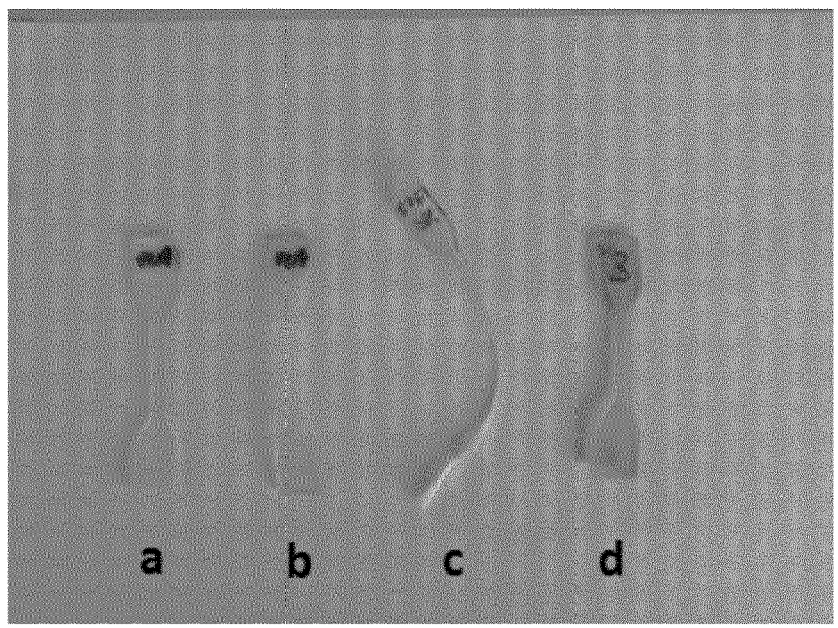
FIG. 2 illustrates test pieces of PLA not subjected to tensile test (a), of PLA subjected to the tensile test until fracture (b), of PLA containing 20% by mass of BDF subjected to the tensile test until fracture (c) and of PLA containing 30% by mass of BDF subjected to the tensile test up to 250% elongation without breaking (d).

FIG. 2 shows the result of the tensile test.

Test piece A serves as a control, does not contain BDF and is not subjected to traction.

Test piece B does not contain BDF.

Test piece C contains 20% BDF.

Test piece D contains 30% BDF.

Figure 3:
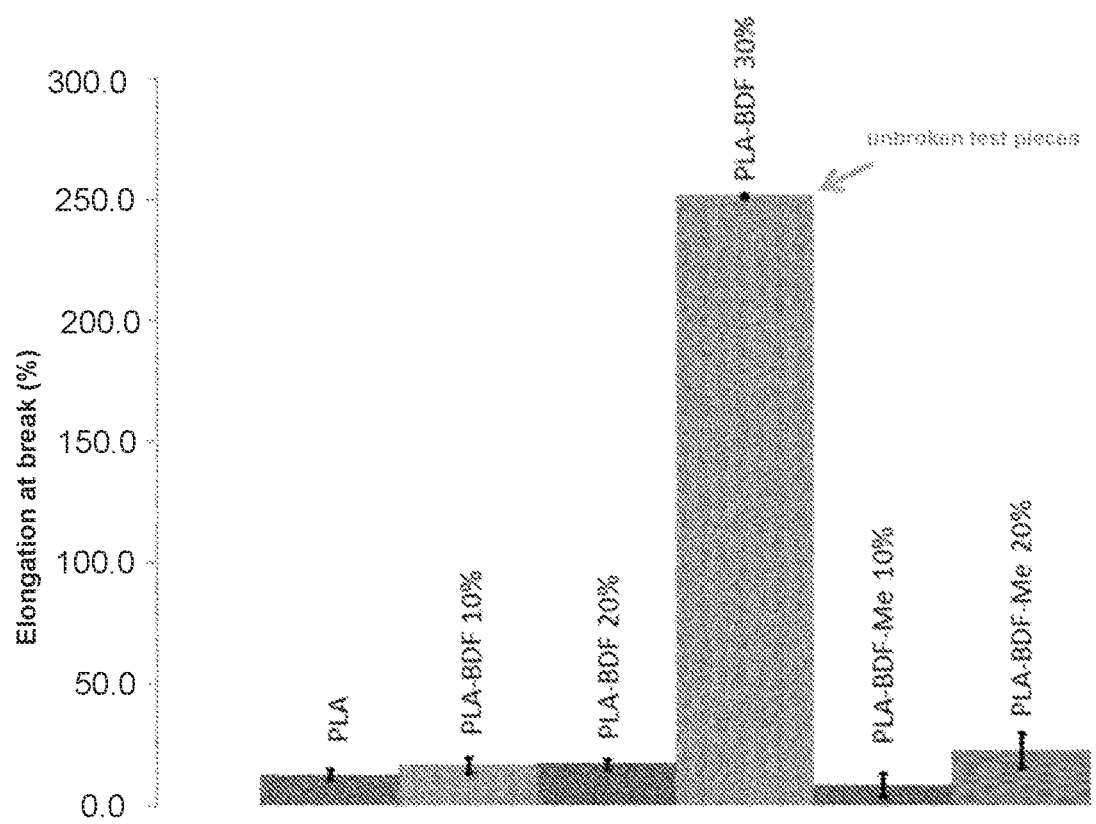
FIG. 3 is a chart illustrating elongation at break measured for different formulations of PLA containing BDF or BDF-Me.

FIG. 3 shows the elongation at break value of virgin PLA and other formulations of PLA containing 10%, 20% and 30% BDF, as well as 10% and 20% BDF-Me mass.

It is observed that the PLA used alone withstands the tensile test very little, does not stretch and breaks immediately. The addition of 10% or 20% BDF in a PLA composition makes it possible to increase the tensile strength of the compound; the compound is then able to stretch, but remains deformed after the test. Lastly, the material containing 30% by mass of BDF exhibits an elongation at break greater than 250% (which means that at 250% elongation the material was not broken and the test was not completed for technical reasons independent of the material). After being stretched to 250% of its original length, the material spontaneously regained its shape within minutes, at a temperature of 20° C. In addition, the material was able to be tested again and showed strictly similar results on 3 consecutive tests, which demonstrates perfect elasticity of the material up to 250% elongation.

Figure 6:
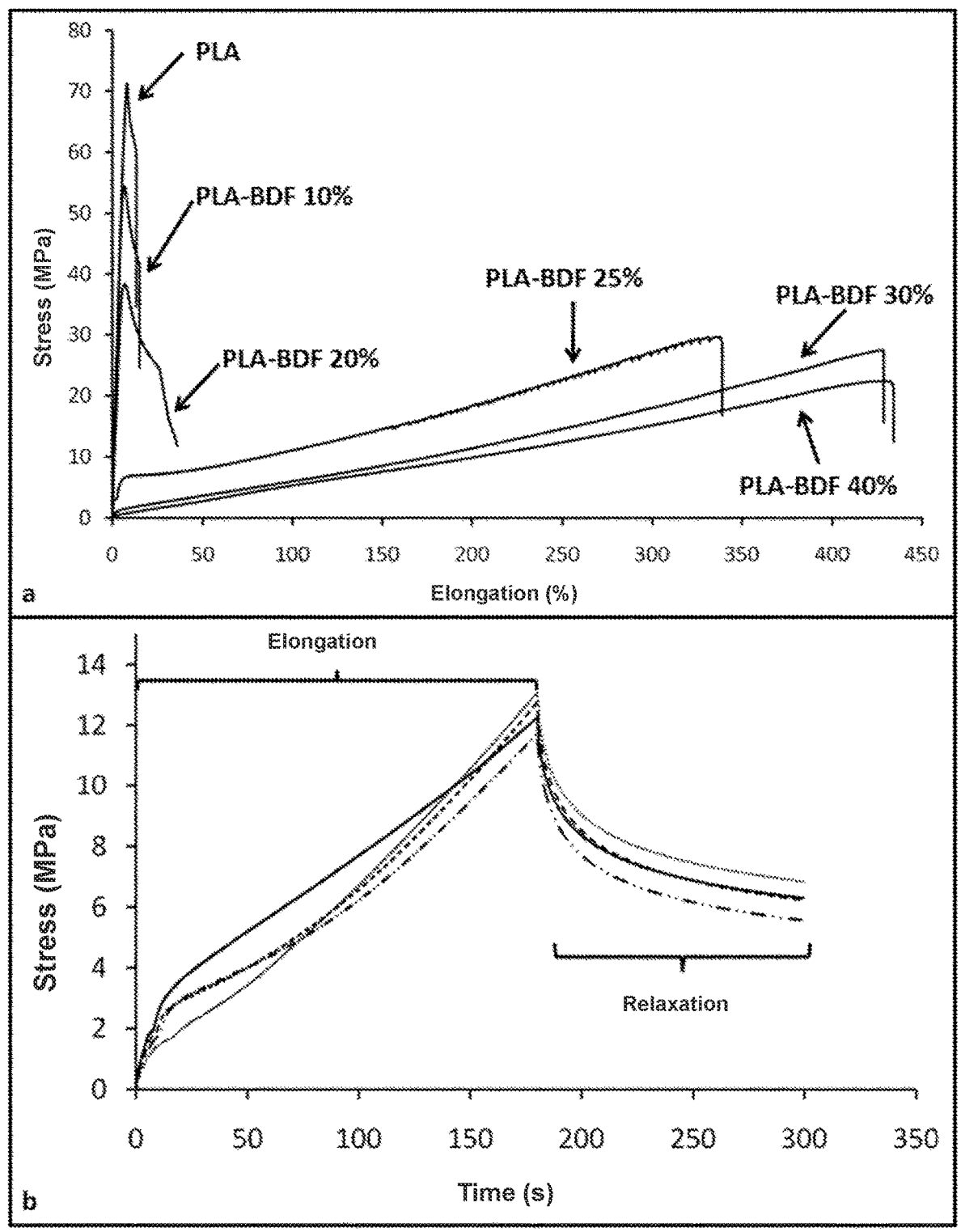
FIG. 6 illustrates graphs of elongation as a function of stress for PLA formulations containing BDF at a mass rate of between 0% and 40% (a); and quantitative measurement of the uniaxial elasticity of a PLA test piece containing a BDF mass rate of 30% measured at an elongation rate of 250% carried out 5 times in a row on the same tensile test piece, where each curve represents a cycle comprising an elongation phase and a relaxation phase (b).

FIG. 6 shows the results of a series of tests carried out on mixtures of a PAD (BDF) and a PHA (PLA), with a quantity by mass of BDF of between 0% and 40%. A dramatic and unexpected change in the elongation at break of the material is observed as soon as the mass percentage of BDF reaches 25%. This elongation at break goes from a value of less than 10% for quantities of BDF less than or equal to 20% by mass, to a value greater than 330% for quantities of BDF greater than or equal to 25% by mass (FIG. 6*a*). The effect is optimal from 30% by mass of BDF.

Example 2: Demonstration of Shape Memory

In order to demonstrate the shape memory properties of the material, it is deformed at room temperature, then cooled while maintaining stress.

Figure 4:
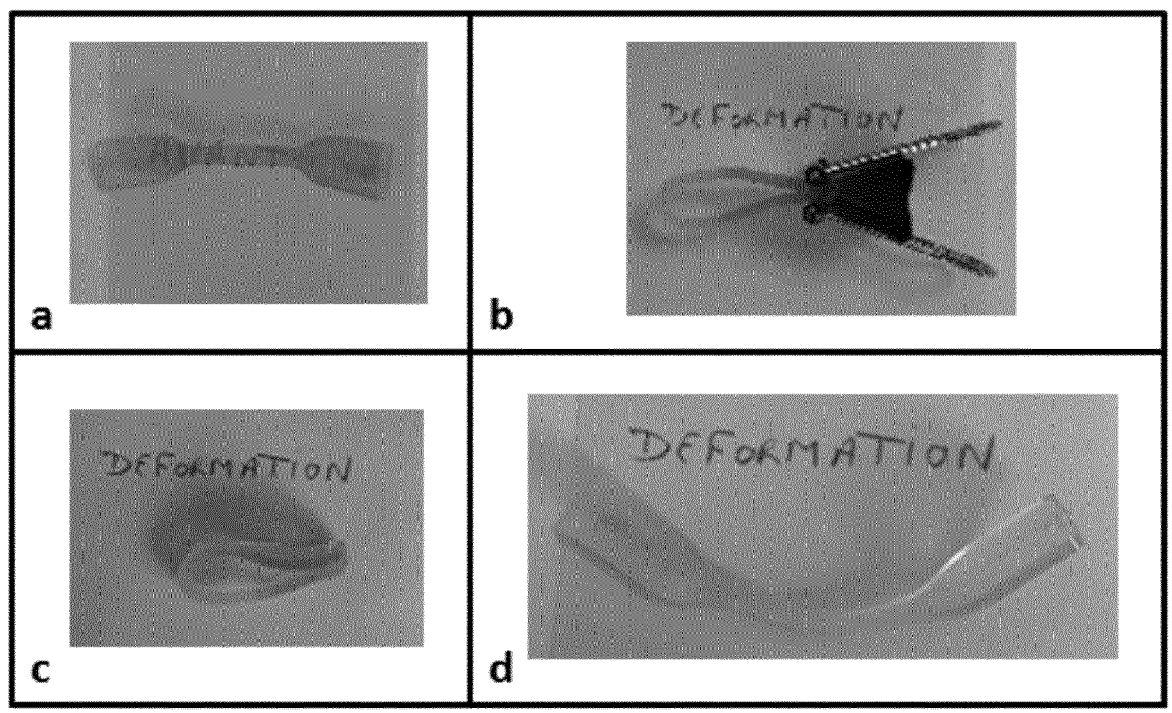
FIG. 4 illustrates examples of stress imposed on a tensile test specimen of the PLA formulation containing 30% by mass of BDF (b), conservation of the deformation without the stress at a temperature of 4° C. for a period of 2 hours (c) and recovery of the initial shape of the test piece after gradual reheating by being placed in the palm of the hand (d).

The result of this test is shown in FIG. 4.

When the material is cooled, the stress is removed. It is then observed that the material remains in the deformed state into which it was forced during its cooling. When the material is warmed in the palm of the hand (37° C.), it then gradually returns to its initial shape.

Figure 5:
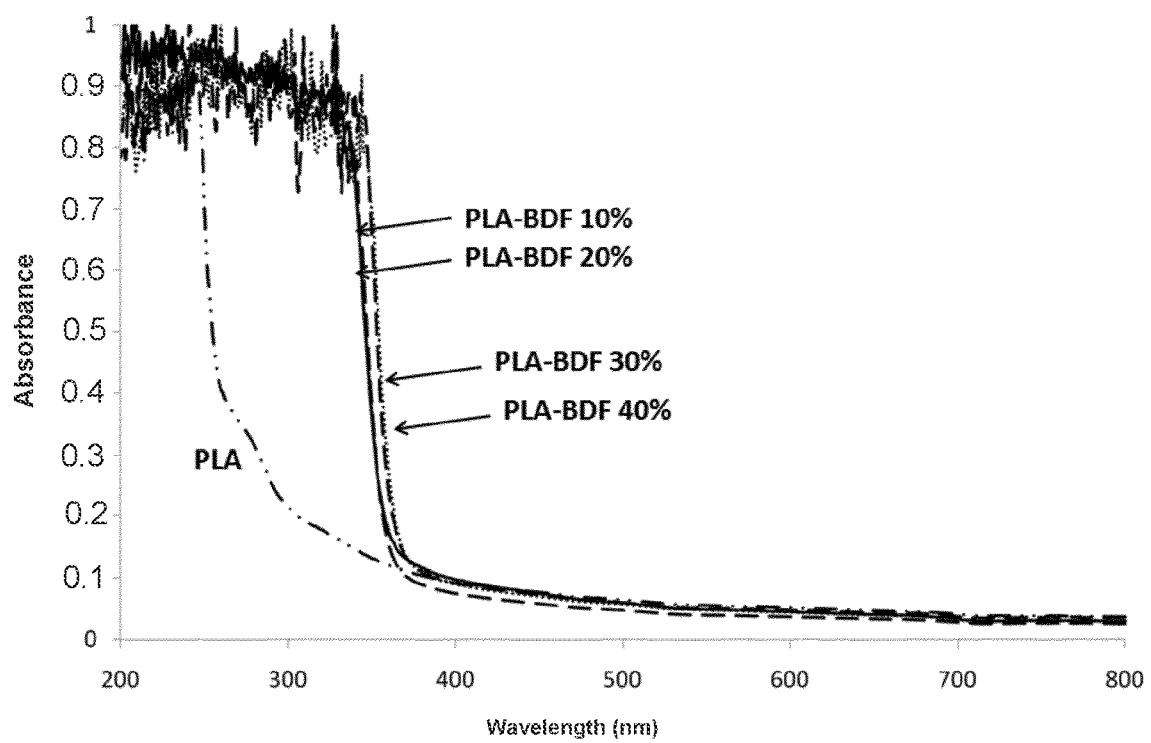
FIG. 5 is a graph demonstrating absorption in the UV spectrum and transparency in the visible spectrum of PLA formulations containing BDF compared to PLA not containing BDF.

Example 3: Effect of Different Levels of BDF in PLA on Absorption in the Visible and Ultraviolet Spectra The absorbance in the visible spectrum (400 to 800 nm) and in the ultraviolet spectrum (200 to 400 nm) of the formulations of PLA containing BDF was measured and compared to those of PLA containing no BDF. The results are shown in FIG. 5.

Formulations of PLA containing BDF at a level greater than or equal to 10% absorb light in a range of 200 to 350 nm, where PLA without BDF only absorbs in a UV range of 200 to 250 nm. The transparency of PLA containing BDF at a mass rate greater than or equal to 10% is identical to that of PLA not containing BDF. Thus, the addition of BDF confers UV absorption properties on the PLA.

Example 4: Demonstration of the Preservation of Mechanical Properties after Incorporation of Mineral Fillers A mixture consisting of 56% PLA, 24% BDF and 20% chalk (mass rates) was prepared in a mixer at 180° C. with a rotational speed of the rotors fixed at 50 RPM. A PLA/BDF mixture (in respective proportions by weight of 70% and 30%) was prepared. This mixture was recovered, then cut into pieces and stored in the open air at room temperature for a week before being reintroduced into the mixer before adding chalk to it. The chalk is raw and has a particle size less than or equal to 20 m. This material was then injected to form tensile test pieces.

Figure 7:
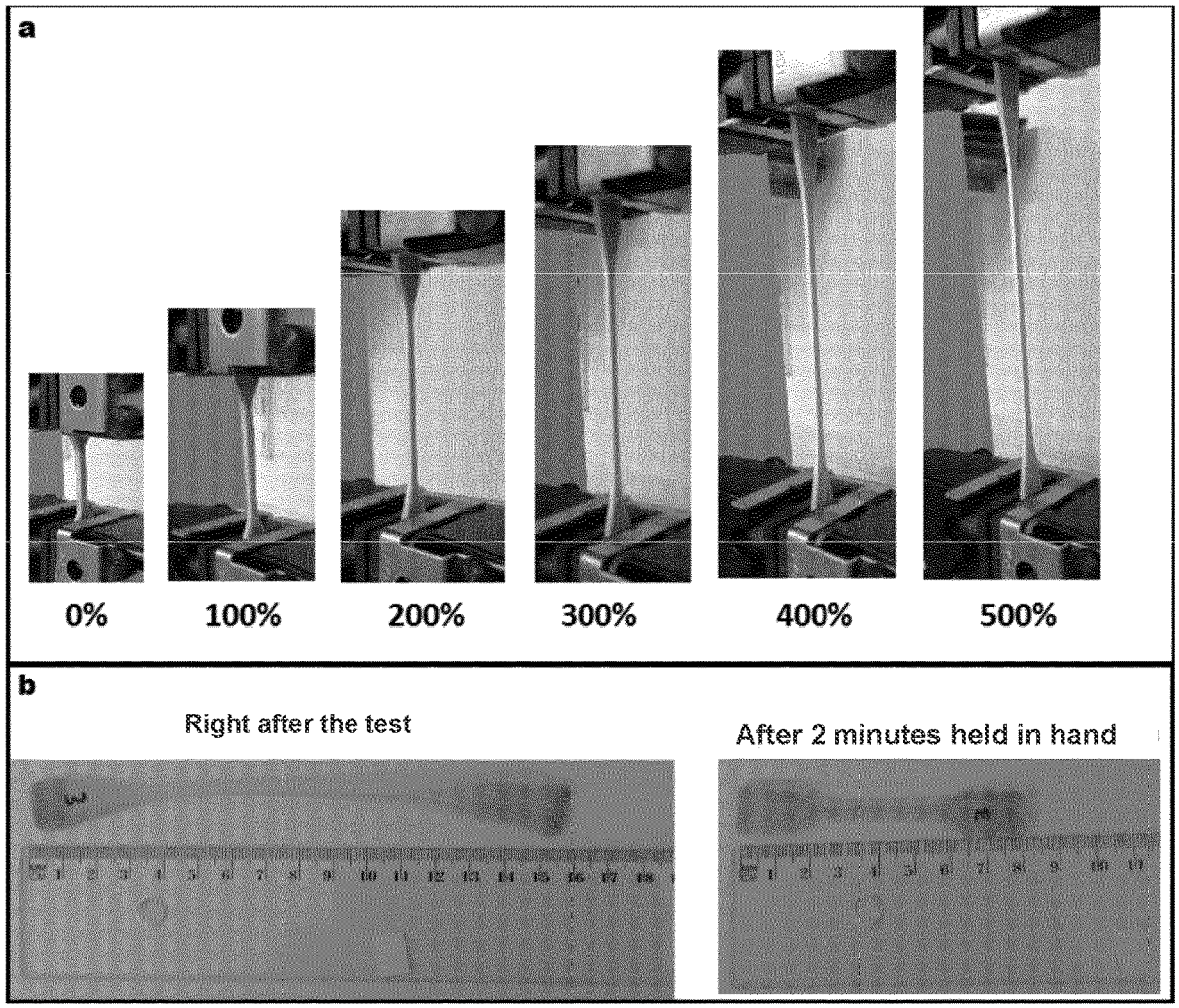
FIG. 7 illustrates a tensile test carried out on a test piece made of PLA, BDF and chalk (a); and recovery of 80% of the original length of the test piece after holding it in hand for 2 minutes (b).

The results of the elongation test are shown in FIG. 7. The elongation at break of this material exceeds 500% elongation, which demonstrates the preservation of the mechanical properties of the PLA/BDF mixture even after adding 20% by mass of chalk (FIG. 7*a*). A test piece was stretched to 500% of its initial tensile zone and removed from the tensile bench before fracture. After being held in hand for 2 minutes, the test piece recovered up to 80% at its tensile zone (FIG. 7*b*).

These results attest that the properties of the material are not altered by the incorporation of chalk.

Example 5: Demonstration of the Degradation of the PLA/BDF Mixture Under Industrial Compost Conditions PLA films containing a mass rate of 30% BDF were prepared by melt pressing using a hydraulic press heated to 180° C. with a maximum pressure of 10 kN. The obtained films have a thickness of between 200 m and 300 m. The films were incorporated into vials containing water and compost leachate from a methanizer, with the exception of one that contained only water. The vials were stored in an oven at 50° C. for 15 days. The results (not shown) show a very clear fragmentation and degradation of the films of PLA/BDF mixtures in the presence of biological organisms, while the film immersed only in water did not fragment.

This result attests to the biodegradability of the material.

Example 6: Demonstration of the Spinning Ability of the PLA/BDF Mixture

A mixture of PLA containing a mass rate of 30% of BDF was prepared in a twin-screw extruder heated to 180° C. with a speed of rotation of the screws of 50 RPM. A wire was pulled out of the extruder die, then wound on the rolls of a spinning bench.

By modulating the speed of the rollers, it was possible to obtain wires with a diameter of between 200 µm and 1 mm. The wires exhibited very good elongation properties, a shape memory effect and great flexibility.

Example 7: Effect of a 30% Mass Rate of BDF in a Copolymer of PLA and PGA

A mixture consisting of 70% of a copolymer of PLA and PGA as defined above and of 30% of BDF (mass rates) was prepared in a mixer at 180° C. with a speed of rotation of the rotors set at 50 RPM. After recovery at the end of the process, the obtained material exhibits shape memory properties similar to those of a material consisting of 70% PLA and 30% BDF (mass rate).

The invention claimed is:

1. An elastomeric shape memory material, comprising:
(i) of a polymer of formula (A1) including at least one poly(hydroxyalkanoate) (PHA) optionally mixed with at least one copolymer

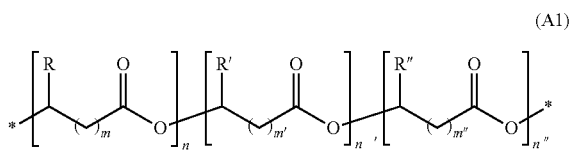

(A1)

wherein:

n, n' and n" are the same or different, and represent the number of monomer units, with n, n' and n" greater than or equal to 0, with the sum of n and n' and n" greater than 2;

m, m' and m" are the same or different, and represent the number of —$CH_2$— groups present in the carbon chain of the repeat monomer unit, with m, m' and m" greater than or equal to 0; and R, R', and R" are the same or different, and represent a hydrogen atom or an alkyl group of formula $C_xH_{2x+1}$ with x, which is an integer greater than or equal to 0; and (ii) at least 25% by mass of at least one functional additive of formula (B1) or (B2):

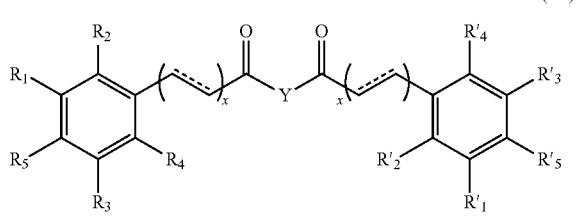

(B1)

(B2)

wherein:

$R_1$, $R'_1$, $R_2$, $R'_2$, $R_3$, $R'_3$, $R_4$, $R'_4$, $R_5$ and $R'_5$, the same or different, each represent a hydrogen atom, a chlorine atom, a bromine atom, an iodine atom, a fluorine atom, an amine ($NH_2$), an alcohol (OH), a thiol (SH), a phosphane ($PH_2$), an alkyl, benzyl, X-alkyl, optionally substituted, X-benzyl group, where appropriate substituted, X-benzoyl, optionally substituted, X-acyl, $B(OR')_2$, NHR', $NO_2$, SR'O or $SO_2R'$;

where X represents N, O, S or P;

R' represents an alkyl group or an aryl group; and

Y represents a linear or cyclic or branched alkyl group, alkenyl, alkynyl, a linear or cyclic diol, an —O—$(CH_2)_n$—O— type diol with 1<n<30 (e.g., 1,3-propanediol, 1,4-butanediol), a polyethylene glycol (PEG), a linear or cyclic diamine, a diamine of type —NR"—$(CH_2)_n$—NR"— with 1<n<30 (e.g., 1,3-propanediamine, 1,4-butanediamine);

where R" represents a hydrogen, a linear, cyclic or branched alkyl group, an aryl group, a protecting group of the acyl, benzyl or benzoyl type;

x is an integer between 0 and 6;

$Z_1$, $Z_2$ and $Z_3$, different or the same, represent an oxygen or nitrogen atom (substituted by a hydrogen, an alkyl group, an aryl group, a protecting group of the acyl, benzyl, benzoyl type); and p is an integer between 1 and 30.

2. The material of claim 1, further comprising between 25% and 50% by mass of the additive.

3. The material of claim 1, wherein the at least polymer of formula (A1) is polylactic acid (PLA).

4. The material of claim 1, wherein the additive is chosen from a compound of formulas (B3), (B4) and (B5) as described below:

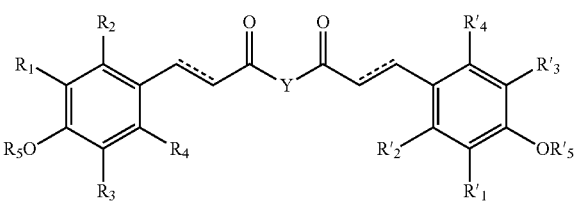

(B3)

wherein:

$R_1$, $R'_1$, $R_2$, $R'_2$, $R_3$, $R'_3$, $R_4$ and $R'_4$ are the same or different, and each represent a hydrogen atom, a chlorine atom, a bromine atom, an iodine atom, a fluorine atom, an alcohol (OH), an amine ($NH_2$), an alkyl, benzyl, X-alkyl, optionally substituted, X-benzyl, optionally substituted, X-acyl group, $B(OR')_2$, NHR', $NO_2$, SR'O or $SO_2R'$;

where X represents N, O, S or P;

and R' represents an alkyl group or an aryl group;

$R_5$ and $R'_5$ are the same or different, and each of them represents a hydrogen atom, an acyl, alkyl (linear or cyclic), aryl, benzyl, benzoyl group;

Y represents a linear or cyclic or branched alkyl group, alkenyl, alkynyl, a linear or cyclic diol, an —O—$(CH_2)_n$—O— type diol with 1<n<30 (e.g., 1,3-propanediol, 1,4-butanediol), a polyethylene glycol (PEG), a linear or cyclic diamine, a diamine of type —NR"—$(CH_2)_n$—NR"— with 1<n<30 (e.g., 1,3-propanediamine, 1,4-butanediamine);

where R" represents a linear, cyclic or branched alkyl group, an aryl group, a protecting group of the acyl, benzyl or benzoyl type;

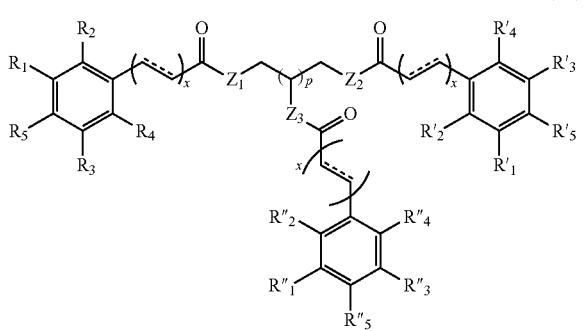

(b4)

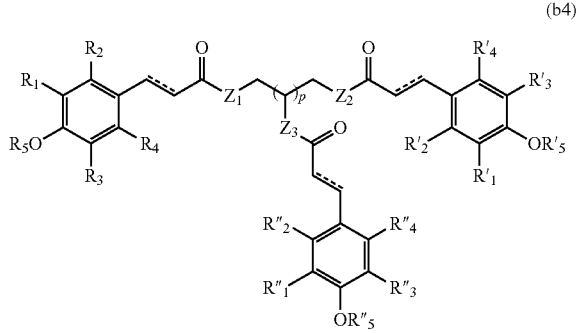

wherein:
R$_1$, R'$_1$, R"$_1$, R$_2$, R'$_2$, R"$_2$, R$_3$, R'$_3$, R"$_3$, R$_4$, R'$_4$ and R"$_4$, are the same or different and each of them represents a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R';
where X represents N, O, S or P;
and R' represents an alkyl group or an aryl group;
R$_5$, R'$_5$ and R"$_5$ are the same or different and each represent a hydrogen atom, an acyl, alkyl (linear or cyclic or branched), aryl, benzyl, benzoyl group;
Z$_1$, Z$_2$ and Z$_3$ are different or the same and represent an oxygen or nitrogen atom (substituted by a hydrogen, an alkyl group, an aryl group, a protecting group of the acyl, benzyl or benzoyl type); and
p is an integer between 1 and 30;

(B5)

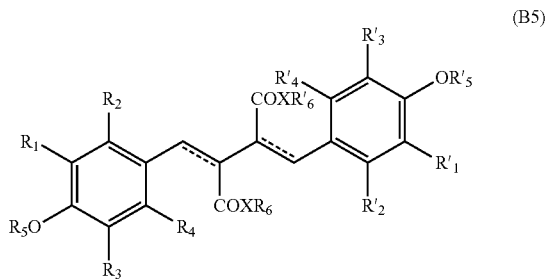

wherein:
R$_1$, R'$_1$, R$_2$, R'$_2$, R$_3$, R'$_3$, R$_4$ and R'$_4$ are the same or different, and each represent a hydrogen atom, a chlorine atom, a bromine atom, an iodine atom, a fluorine atom, an alcohol (OH), an amine (NH$_2$), an alkyl, benzyl, X-alkyl, optionally substituted, X-benzyl, optionally substituted, X-acyl group, B(OR')$_2$, NHR', NO$_2$, SR'O or SO$_2$R';
where X represents N, O, S or P and R' represents an alkyl group or an aryl group;
R$_5$ and R'$_5$, are the same or different and represent hydrogen, a linear, cyclic or branched alkyl group, a protecting group of the acetyl, benzyl or benzoyl type;
R$_6$ and R'$_6$ are the same or different and represent a linear, cyclic or branched alkyl group or a hydro (mono- or di-)organic acid group, any other chemical unit such as for example a carbohydrate, or an amino acid; and
X is an O, a NR$_7$ group in which R$_7$ is hydrogen, a linear, cyclic or branched alkyl group, aryl, an acyl, benzyl, or benzoyl type protecting group.

5. The material of claim 1, said wherein the at least one functional additive is a ferulic acid derivative.

6. The material of claim 5, characterized in that the derivative is butane-1,4-di(dihydroferulate) (BDF).

7. The material of claim 1, further comprising at least one adjuvant.

8. The material of claim 1, wherein the material is more than 50% biobased.

9. A method of manufacturing an elastomeric material with shape memory as defined in claim 1, comprising forming a molten mixture of the polymer of formula (A1) and the additive of formula (B1) or (B2).

10. The method of claim 9, wherein the polymer of formula (A1) is a polyhydroxyalkanoate and the additive of formula (B1) or (B2) is a p-hydroxycinnamic acid derivative.

11. The method of claim 9, further comprising adding the polymer of formula (A1) and the additive of formula (B1) or (B2) to an internal mixer or an extruder for 1 to 30 minutes, the internal mixer or the extruder having a rotational speed of between 10 and 150 rotations per minute, and a temperature of between 140 and 200° C.

12. A method comprising using a material according to claim 1 to prevent/slow down the aging of composites obtained from the material and additives or reinforcing fillers added to the material.

13. A method comprising using a material according to claim 1 to confer anti-UV properties on a composite material containing the material.

14. A method comprising using a material according to claim 1 as a protective, reinforcing, cladding or embellishment material having mechanical properties enabling substitution for materials based on technical polymers such as plasticized PVC, polyolefins, polyesters, polyurethanes and polyamides.

15. A medical device comprising a material according to claim 1.

* * * * *